United States Patent
Eckert

Patent Number: 5,664,456
Date of Patent: Sep. 9, 1997

[54] ULTRASONIC TRANSDUCER

[75] Inventor: Manfred Eckert, Todtnau, Germany

[73] Assignee: Endress+Hauser GmbH+Co., Maulburg, Germany

[21] Appl. No.: 720,081

[22] Filed: Sep. 27, 1996

[30] Foreign Application Priority Data

Sep. 28, 1995 [EP] European Pat. Off. ............. 95115281

[51] Int. Cl.⁶ .................................................. G01F 23/28
[52] U.S. Cl. ...................... 73/290 V; 367/152; 367/162; 310/324; 310/326
[58] Field of Search ...................... 73/290 V, 570, 73/644; 367/152, 162, 176; 310/324, 326, 322

[56] References Cited

U.S. PATENT DOCUMENTS

| | | |
|---|---|---|
| 2,430,013 | 11/1947 | Hansell . |
| 4,130,018 | 12/1978 | Adams et al. .......................... 73/290 V |
| 4,184,094 | 1/1980 | Kopel .................................... 367/152 |
| 4,326,274 | 4/1982 | Hotta et al. ............................. 310/326 |
| 4,523,122 | 6/1985 | Tone et al. .............................. 367/152 |
| 4,984,449 | 1/1991 | Caldwell et al. ..................... 73/290 V |
| 5,121,628 | 6/1992 | Merkle et al. . |
| 5,329,682 | 7/1994 | Thurn et al. . |
| 5,363,341 | 11/1994 | Schwald et al. ....................... 73/290 V |
| 5,375,099 | 12/1994 | Gill ........................................... 367/152 |
| 5,418,759 | 5/1995 | Fiebiger et al. ......................... 367/152 |
| 5,541,468 | 7/1996 | Frey et al. ................................ 310/327 |

FOREIGN PATENT DOCUMENTS

| | | |
|---|---|---|
| 04 98 015 | 8/1992 | European Pat. Off. . |
| 43 23 134 | 6/1994 | Germany . |
| 43 25 398 | 7/1994 | Germany . |

Primary Examiner—Scott Cummings
Attorney, Agent, or Firm—Bose McKinney & Evans

[57] ABSTRACT

This ultrasonic transducer has a high chemical resistance and a small diameter and can be used over a very wide temperature range. It has a single-piece, can-shaped housing (1) sealed off by a diaphragm (12), a sensor element (2), arranged in the housing (1), for transmitting and receiving ultrasound, a matching layer (3) arranged between the diaphragm (12) and the sensor element (2), a stress equalizing layer (5) which completely encloses the sensor element (2) apart from a front area adjoining the matching layer (3) and is made of a thermosetting plastic, especially of an epoxy resin, a clamping ring (4) coaxially enclosing the matching layer (3), and a damping layer (6) that fills a cavity that remains in the housing (1) and is bounded by the clamping ring (4), the stress equalizing layer (5) and the housing (1).

8 Claims, 1 Drawing Sheet

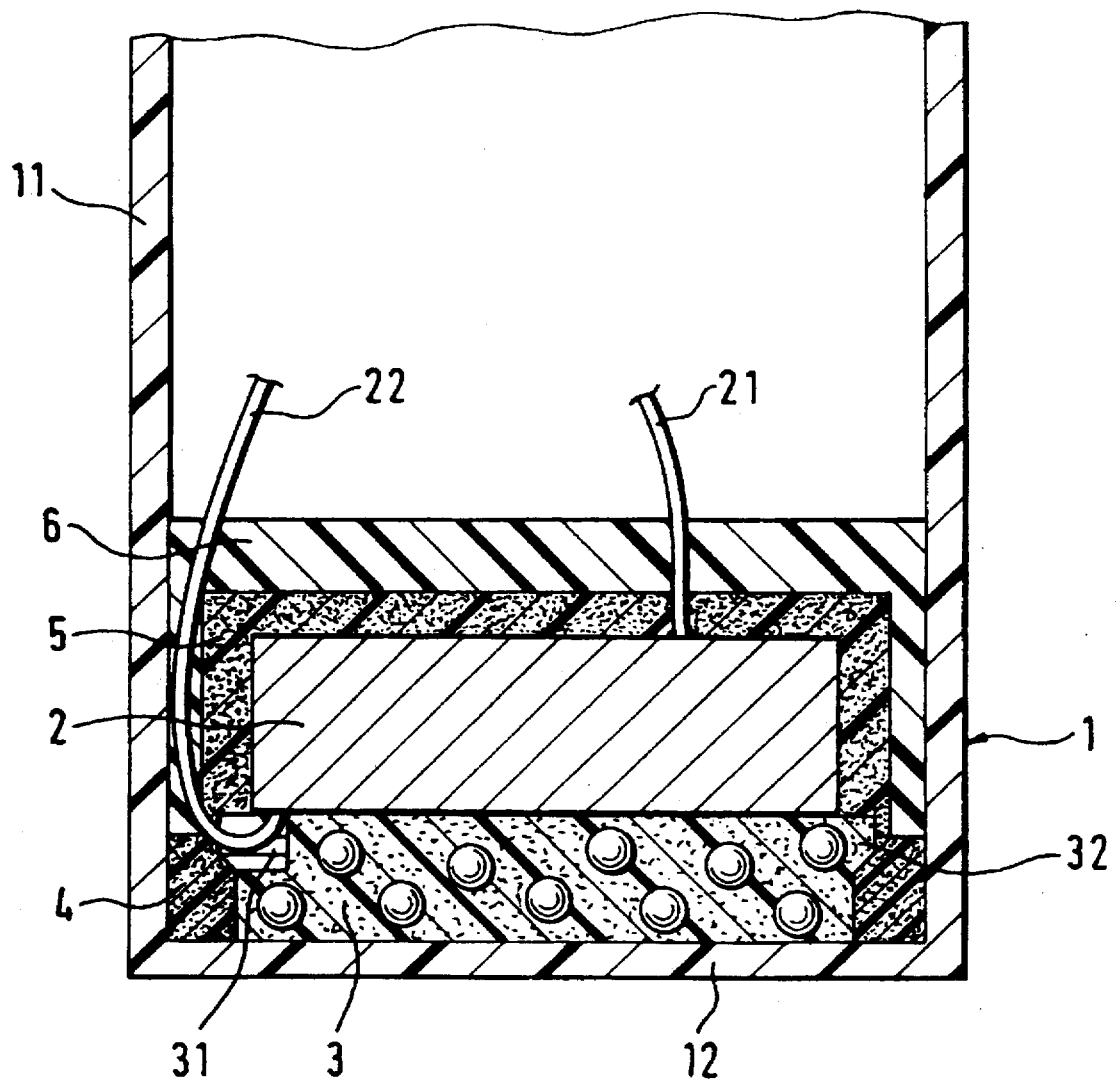

ULTRASONIC TRANSDUCER

BACKGROUND OF THE INVENTION

The invention relates to an ultrasonic transducer, in particular for measuring a filling level, for example in a container, or for measuring a level, for example in a channel or on a conveyor belt.

An ultrasonic pulse emitted by the ultrasonic transducer is reflected at the surface of the filling material. The propagation time of the ultrasonic pulse from the sensor to the surface and back is determined and the filling level or the level is determined therefrom.

DESCRIPTION OF THE PRIOR ART

Ultrasonic transducers of this type are used in many sectors of industry, for example in the water supply and sewage sector and in the chemical industry. In particular in the chemical industry, ultrasonic transducers of high chemical resistance are necessary which can be used over a wide temperature range.

The ultrasonic transducers preferably have a small diameter, for example in order that the openings in the container or of a sound guiding tube in which they are to be installed can likewise be small.

To generate the ultrasonic pulse, use is normally made of a disk-shaped piezoelectric element arranged in a can-like housing, the element being excited into oscillations. The bottom of the housing has the function of a diaphragm onto which the oscillations are transmitted and from which the ultrasonic pulses are then radiated.

Between the piezoelectric element and the diaphragm there is arranged a plastic layer, referred to below as matching layer, for matching the acoustic impedance of the piezoelectric element to the acoustic impedance of the medium into which the ultrasonic pulses are to be transmitted.

A cavity which remains in the housing and is bounded by a circular surface facing away from the diaphragm and a cylindrical covering surface of the piezoelectric element is filled with a damping layer which is made, for example, of a plastic. This damping layer serves for the purpose of minimizing the radiation of sound energy in the radial direction and in the direction facing away from the diaphragm.

Such ultrasonic transducers normally have a diameter from 7 cm to 25 cm and are operated in a frequency range from 15 kHz to 60 kHz. The smaller the dimensions of the piezoelectric element and hence of the ultrasonic transducer, the greater is the transmission frequency.

On account of the temperature behavior of the matching layer, the damping layer, the piezoelectric element and the housing, in particular the temperature dependency of the speeds of sound and the sound impedances of these components, their use is normally restricted to a temperature range from −20° C. to 80° C.

U.S. Pat. No. 4,130,018 describes an ultrasonic transducer having

- a can-shaped housing sealed off by a laminated-on diaphragm,
- a sensor element, arranged in the housing, for transmitting and receiving ultrasound,
- a matching layer, arranged between the diaphragm and the sensor element and made of polyurethane, in which hollow glass spheres are embedded,
- a first layer, surrounding a section of the sensor element facing away from the diaphragm, made of polyurethane for damping,
- in whose portions directly adjacent to the sensor element there are arranged lead spheres for the absorption of sound energy,
- a second layer, coaxially enclosing a section of the matching layer facing towards the diaphragm, for damping and made of solid polyurethane and
- a third damping layer that fills a cavity that remains in the housing and is bounded by the first and the second layer and the housing, said third damping layer being made of polyurethane foam.

The ultrasonic transducer described is operated at a frequency of 50 kHz and has corresponding dimensions. The sensor can be used over a temperature range of −30° C. to 70° C.

Since the diaphragm which is laminated on the housing is very thin in comparison with the matching layer, it causes no significant additional stresses which load the sensor element mechanically over the temperature. The connecting points between the housing and the diaphragm, however, reduce the chemical resistance of the ultrasonic transducer.

In order that the most constant speeds of sound and sound impedances are present, the matching layer according to U.S. Pat. No. 4,130,018 is to be constructed approximately nine times as thick as the diaphragm. Since the diaphragm is laminated on, it can have a low thickness. However, a very thin diaphragm, made for example from a thermoplastic with a thickness of 0.5 mm, is not diffusion-tight. Therefore, in the long term, gases diffuse through the diaphragm and can effect destruction of the connection between the matching layer and the diaphragm.

In order to ensure a maximum energy transfer through the matching layer, the diaphragm and the matching layer are to be constructed such that the sum of the propagation times of the ultrasound through the matching layer and the diaphragm is equal to one quarter or an odd multiple of one quarter of the periodic duration of the ultrasound. Since the matching layer effects an attenuation of the ultrasound, however, in the case of practical applications a propagation time of one quarter of the periodic duration is to be required, and not an odd multiple thereof.

Since the minimum thickness of the diaphragm is determined by the application as a result of the requirement for chemical resistance and diffusion resistance, the two dimensioning rules mentioned above supply an upper limit for the frequency range or a lower limit for the diameter of the ultrasonic transducer.

SUMMARY OF THE INVENTION

It is an object of the invention to specify an ultrasonic transducer which has a high chemical resistance and a small diameter and can be used over a very wide temperature range.

To this end, the invention comprises an ultrasonic transducer having

- a single-piece can-shaped housing sealed off by a diaphragm,
- a sensor element, arranged in the housing, for transmitting and receiving ultrasound,
- a matching layer arranged between the diaphragm and the sensor element,
- a stress equalizing layer which completely encloses the sensor element apart from a front area adjoining the matching layer and is made of a thermosetting plastic, especially of an epoxy resin, a clamping ring coaxially enclosing the matching layer, and a damping layer that fills a cavity that remains in the housing and is bounded by the clamping ring, the stress equalizing layer and the housing.

According to one refinement of the invention, the clamping ring has in the radial direction a thickness in which the sum of the propagation times of the ultrasound through the clamping ring and through the housing in the radial direction is equal to half the periodic duration of the ultrasound.

According to another refinement of the invention, the clamping ring consists of a thermosetting plastic, especially of an epoxy resin, having a high density, especially of 1.7 g/cm$^3$ to 2.0 g/cm$^3$, a high acoustic impedance, especially of about 40·10$^5$ kg/s m$^2$, and a low coefficient of thermal expansion, especially of about 50·10$^{-6}$ 1/K.

According to a further refinement of the invention, the stress equalizing layer consists of a thermosetting plastic, especially of an epoxy resin, having a high density, especially about 1.5 g/cm$^3$, a high acoustic impedance, especially of about 35·10$^5$ kg/s m$^2$, and a low coefficient of thermal expansion, especially of about 50·10$^{-6}$ 1/K.

According to a further refinement of the invention, the matching layer consists of an epoxy resin filled with hollow glass spheres, especially having a density of 0.4 g/cm$^3$ to 0.6 g/cm$^3$, an acoustic impedance of about 11·10$^5$ kg/s m$^2$, and a low coefficient of thermal expansion of about 25·10$^{-6}$ 1/K.

According to a further refinement of the invention, the matching layer and the diaphragm have a thickness in which the sum of the propagation times of the ultrasound in the matching layer and in the diaphragm is equal to one quarter of the periodic duration of the ultrasound.

According to a further refinement of the invention, the damping layer consists of a silicone elastomer.

According to a further refinement of the invention, the stress equalizing layer consists of a material whose glass point lies at a temperature which is located approximately in the center of the temperature range in which the ultrasonic transducer can be used.

BRIEF DESCRIPTION OF THE DRAWING

The invention and its advantages are explained in more detail using the FIGURE of the drawing, in which an exemplary embodiment is shown; the FIGURE shows a longitudinal section through an ultrasonic transducer.

BRIEF DESCRIPTION OF THE DRAWING FIGURE

The FIGURE is a cross-sectional view of the exemplary embodiment of the invention.

DESCRIPTION OF THE PREFERRED EMBODIMENT

The exemplary embodiment shown in FIG. 1 of an ultrasonic transducer has a can-shaped, single-piece housing 1. This comprises a hollow cylinder 11 which is sealed off at one end by a diaphragm 12. The housing 1 consists of a plastic, preferably of a thermoplastic having a high chemical resistance, for example polyvinyl difluoride (PVDF) or polypropylene (PP). The diaphragm 12 has a thickness of, for example, 2 mm, by which means high chemical and mechanical resistance is ensured.

Arranged in the housing 1 is a sensor element 2 which serves alternately for the transmission and for the reception of ultrasonic pulses. It is, for example, a cylindrical piezoelectric element, in particular made of lead titanate zirconate, on whose circular surfaces there are arranged electrodes, for example silver metallizations applied to the piezoelectric element. Electrical connecting lines 21, 22 are connected to the electrodes, for example by soldering on.

The sensor element 2 is intended to be excited by an electronic circuit, not shown in the FIGURE, into pulsed oscillations. Following each transmission of an ultrasonic pulse, the sensor element 2 serves as a receiving element. As a result of the ultrasonic pulse reflected at a surface, for example of a filling material, the sensor element 2 is excited into oscillations. The resulting piezoelectric voltage is intended to be fed via the connecting lines 21, 22 to a further electronic circuit, likewise not shown, which determines the propagation time of the ultrasonic pulse, determines therefrom the filling level, for example, and makes a signal corresponding to the filling level accessible for further processing and/or indication.

To match the acoustic impedance of the sensor element 2 to the acoustic impedance of the medium into which the ultrasonic pulses are to be sent, a matching layer 3 made of a plastic is arranged between the sensor element 2 and the diaphragm 12. Said plastic is preferably an epoxy resin. In comparison with polyurethane or silicone elastomers, epoxy resin has a low coefficient of thermal expansion.

In addition, epoxy resin has a virtually constant speed of sound over a very wide temperature range from −50° C. to 120° C. and a virtually constant sound impedance. The deviations of these two values over the entire temperature range from −50° C. to 120° C. are less than 4.5%.

To match the acoustic impedance of the piezoelectric element to the acoustic impedance of the medium into which the ultrasonic pulses are to be transmitted, hollow spheres, made for example of glass, are arranged in the matching layer 3.

In order to ensure a maximum energy transfer through the matching layer 3, the diaphragm 12 and the matching layer 3 are to be constructed such that the sum of the propagation times of the ultrasound in the matching layer 3 and in the diaphragm 12 is equal to one quarter of the periodic duration of the ultrasound.

In the case of a transmission frequency of 70 kHz and a diaphragm 12 made of PVDF with a thickness of 2 mm, there results for a matching layer 3 made of an epoxy resin having a speed of sound of 2200 m/s a thickness of the matching layer 3 of 4 mm. In the case of a correspondingly smaller thickness of the matching layer 3, still higher frequencies of up to 100 kHz can be realized. In the case of identical material selection and identical diaphragm thickness, the thickness of the matching layer at a frequency of 100 kHz is about 1.5 mm.

The matching layer 3 is, for example, a turned part which is intended to be connected to the sensor element 2 by means of an epoxy adhesive. It has a cutout 31, through which the connecting line 22 is led into the housing 1.

Stresses which arise as a result of the fact that the diaphragm 12 has a greater coefficient of thermal expansion than the matching layer 3 are transmitted through the matching layer 3 to the sensor element 2. At high temperatures, the sensor element 2 is thereby subjected essentially to pressure stresses; at low temperatures essentially to tensile stresses. Piezoelectric elements are relatively rugged with respect to pressure stresses, but on the other hand tensile stresses can be absorbed only to a very low extent by the sensor element 2. Especially at very low temperatures, the thermal stresses therefore cause cracks or breakage of the sensor element 2. This is all the more so, the smaller the thickness of the matching layer 3 with respect to the thickness of the diaphragm 12. However, it is exactly at high frequencies that a thin matching layer 3 and a thick diaphragm 12 are required, for the reasons cited above.

The sensor element 2 is therefore enclosed, apart from a front area adjoining the matching layer 3, by a stress equalizing layer 5 made of a thermosetting plastic, especially of an epoxy resin, having a high density, especially of about 1.5 g/cm$^3$, a high acoustic impedance, especially of about 35·10$^5$ kg/s m$^2$, and a low coefficient of thermal expansion of about 50·10$^{-6}$ 1/K.

The stress equalizing layer 5 serves to protect the sensor element 2 from stresses which occur. Since it encloses the sensor element 2 symmetrically, only symmetrical forces act upon the latter. In particular, no notch effects occur. The greatest stresses occur, as finite element calculations show, in the stress equalizing layer 5 and no longer in the sensor element 2. The fatigue strength of the sensor element 2 in the installed state is considerably increased thereby and cracks or breakage of the sensor element 2 no longer occur. By this means, the ultrasonic transducer can be used even at very low temperatures of down to −50° C.

The glass point of the material of the stress equalizing layer 5 lies preferably in the center of the temperature range in which the ultrasonic transducer is to be used, for example between 30° C. and 40° C. in the case of a temperature range from −50° C. to 120° C. As a result, there is firm clamping of the sensor element 2 at low temperatures.

At high temperatures, firm clamping of the sensor element 2 is no longer absolutely necessary. In this range, that is to say above the glass point of the material of the stress equalizing layer 5, the latter is more elastic and is thus less sensitive to temperature-induced stresses. As a result of the abovementioned selection of the glass point, it is possible to use the ultrasonic transducer over a very large temperature range, from −50° C. to 120° C.

In addition, by virtue of the high acoustic impedance of the stress equalizing layer 5, in particular of about 35·10$^5$ kg/s m$^2$, damping of the ultrasound radiated in the radial direction and in the direction away from the diaphragm is effected.

For the purposes of applying the stress equalizing layer 5, the composite oscillator formed by the sensor element 2 and the matching layer 3 is introduced, for example, into a mold, into which the liquid epoxy resin is to be filled. For the purposes of fastening such a mold to the composite oscillator, the matching layer 3 has, on that side facing the sensor element, an offset ring 32. Epoxy resin offers the advantage that it adheres very well to a multiplicity of materials.

To improve the directional characteristics of the ultrasonic pulses to be transmitted, an annular clamping ring 4, which encloses the matching layer coaxially, is arranged on the diaphragm 12. The said clamping ring consists of a thermosetting plastic, preferably of an epoxy resin having a high density of 1.7 g/cm$^3$ to 2 g/cm$^3$, and effects firm clamping of the matching layer 3 in the housing 1. As a result, amplitude peaks on the diaphragm edge are suppressed and the proportion of the sound energy which is emitted is increased.

The proportion of the sound energy which is available for generating the measuring signal at a predetermined frequency is thus considerably increased. This is advantageous in particular at high frequencies, since high-frequency ultrasonic waves experience a more severe attenuation in air than low-frequency waves.

At the same time, the radiation of sound energy in the radial direction is reduced by the clamping ring 4. For this purpose, the clamping ring 4 has a high acoustic impedance, especially of about 40·10$^5$ kg/s m$^2$, and in the radial direction it has a thickness which is to be selected such that the sum of the propagation times of the ultrasound through the clamping ring 4 and through the housing 1 in the radial direction is equal to half of the periodic duration of the ultrasound.

For a transmission frequency of, for example, 70 kHz and a clamping ring 4 made of epoxy resin with a density of 1.8 g/cm$^3$ and a speed of sound of 2300 m/s, and in the case of a housing 1 made of polyvinyl difluoride with a wall thickness of 2 mm, the result is a thickness of the clamping ring 4 of about 5 mm in the radial direction. A distance of 5 mm between the sensor element 2 and the housing 1 is to be maintained in any case, in order that the oscillation behavior of the sensor element 2 is not disturbed by the mechanical coupling to the housing 1. The dimensions of the ultrasonic transducer therefore remain unchanged by the clamping ring 4. At a frequency of 70 kHz, the ultrasonic transducer has an outer diameter of 3.8 cm; at a frequency of 100 kHz, the outer diameter is about 2.5 cm. It can be used over a temperature range from −50° C. to 120° C.

A cavity which remains in the housing 1 and is bounded by the clamping ring 4, the stress equalizing layer 5 and the housing 1 is filled with a damping layer 6 made of a plastic. This damping layer serves for the purpose of minimizing the radiation of sound energy in the radial direction and in the direction away from the diaphragm and it preferably consists of a silicone elastomer.

I claim:

1. An ultrasonic transducer having
   a single-piece can-shaped housing (1) sealed off by a diaphragm (12),
   a sensor element (2), arranged in the housing (1), for transmitting and receiving ultrasound,
   a matching layer (3) arranged between the diaphragm (12) and the sensor element (2),
   a stress equalizing layer (5) which completely encloses the sensor element (2) except for a front side adjoining the matching layer (3) and is made of of an epoxy resin,
   a clamping ring (4) coaxially enclosing the matching layer (3), and
   a damping layer (6) that fills a cavity that remains in the housing (1) and is bounded by the clamping ring (4), the stress equalizing layer (5) and the housing (1).

2. The ultrasonic transducer as claimed in claim 1, in which the clamping ring (4) has in the radial direction a thickness in which the sum of the propagation times of the ultrasound through the clamping ring (4) and through the housing (1) in the radial direction is equal to half of the periodic duration of the ultrasound.

3. The ultrasonic transducer as claimed in claim 1, in which the clamping ring (4) consists of an epoxy resin, having a high density of 1.7 g/cm$^3$ to 2.0 g/cm$^3$, a high acoustic impedance of about 40·10$^5$ kg/s m$^2$, and a low coefficient of thermal expansion of about 50·10$^{-6}$ 1/K.

4. The ultrasonic transducer as claimed in claim 1, in which the stress equalizing layer (5) consists of an epoxy resin, having a high density of 1.5 g/cm$^3$, a high acoustic impedance of about 35·10$^5$ kg/s m$^2$, and a low coefficient of thermal expansion of about 50·10$^{-6}$ 1/K.

5. The ultrasonic transducer as claimed in claim 1, in which the matching layer (3) consists of an epoxy resin filled with hollow glass spheres having a density of 0.4 g/cm$^3$ to 0.6 g/cm$^3$, an acoustic impedance of about $11 \cdot 10^5$ kg/s m$^2$, and a low coefficient of thermal expansion of about $25 \cdot 10^{-6}$ 1/K.

6. The ultrasonic transducer as claimed in claim 1, in which the thickness of the matching layer (3) and the thickness of the diaphragm (12) are such that the sum of the propagation times of the ultrasound in the matching layer (3) and in the diaphragm (12) is equal to one quarter of the periodic duration of the ultrasound.

7. The ultrasonic transducer as claimed in claim 1, in which the damping layer (6) consists of a silicone elastomer.

8. The ultrasonic transducer as claimed in claim 1, in which the stress equalizing layer (5) consists of a material whose glass point lies at a temperature which is located approximately in the center of the temperature range in which the ultrasonic transducer can be used.

* * * * *